UNITED STATES PATENT OFFICE.

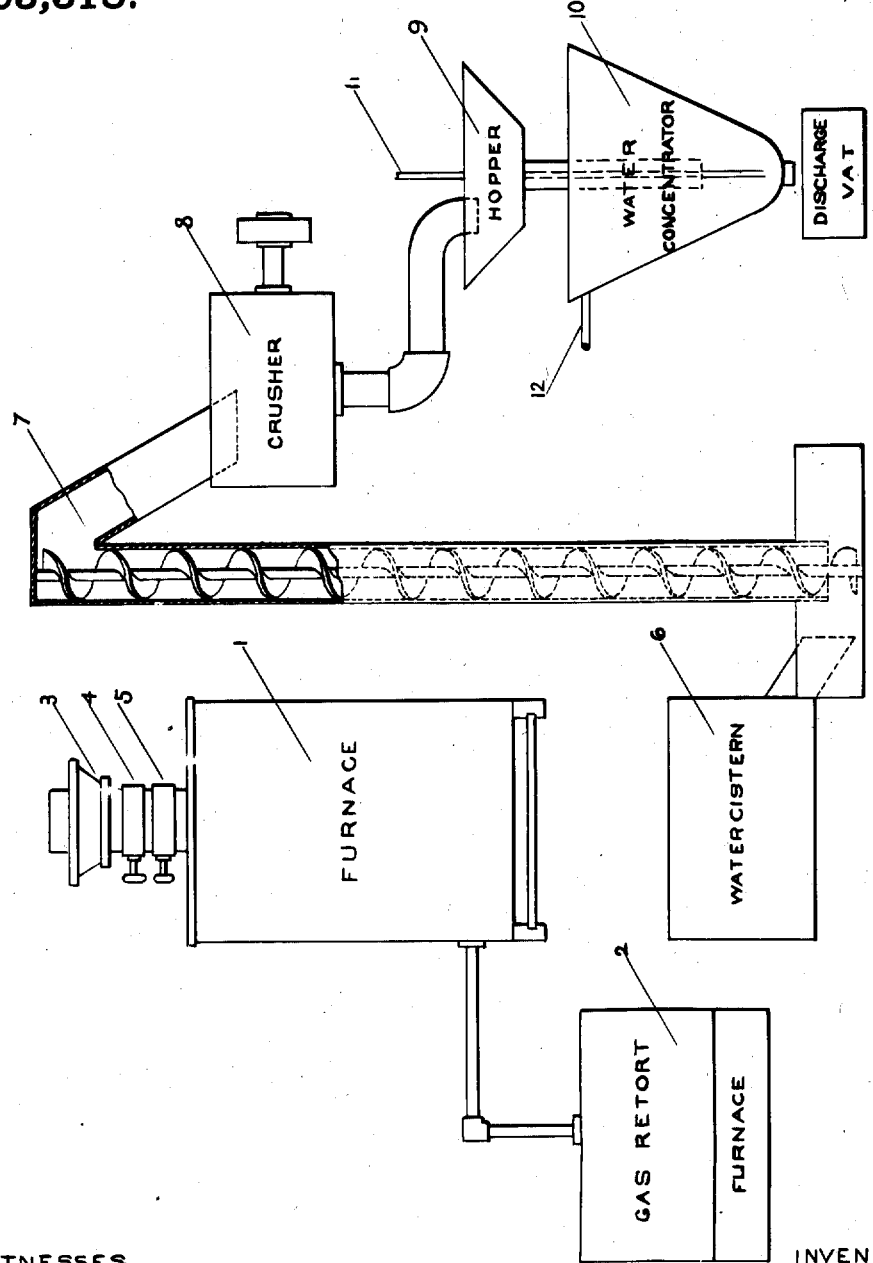

GEORGE F. RENDALL, OF NEW YORK, N. Y., ASSIGNOR TO AMERICAN REDUCTION COMPANY, A CORPORATION OF NEW JERSEY.

METHOD OF REDUCING ORES.

No. 903,318.      Specification of Letters Patent.      Patented Nov. 10, 1908.

Application filed April 23, 1906. Serial No. 313,123.

*To all whom it may concern:*

Be it known that I, GEORGE F. RENDALL, a subject of the King of Great Britain, residing in the city, county, and State of New York, have invented a new and useful Method of Reducing Ores, of which the following is a specification.

My present invention consists of a novel process for reducing ore to a metalloid without reducing the silicious content, the ore being retained in its original form and furthermore no flux is required in the reducing operation.

My invention further consists of a novel process in which I employ a gas, which eliminates the deleterious material and leaves the ore and the metal contained therein in a natural and unoxidized condition.

Another novel feature of my present method is the manner in which the silica is eliminated; this being effected at a very nominal expense by the employment of clean water, acting on the material in a suitable tank or water concentrator.

Another novel feature of my present method is the discharging of the ore in its heated condition from the furnace directly into a tank or cistern of water, thereby disintegrating the material.

In the accompanying drawing, I have shown a diagrammatical view of one form of an apparatus, which may be employed to advantage in carrying out my present method, although it will be apparent that other structures than the one shown and otherwise correlated and arranged may be employed according to the conditions and requirements.

In carrying out my novel process, I proceed as follows:—The ore to be treated is first placed in a furnace 1, of any suitable or conventional type and in this furnace it is heated to a low incandescent heat without changing the structural form of the ore, or forming a flux. While in this condition, the material in the furnace is subjected to a current of gas produced in a gas retort, said gas being produced either by the decomposition of water or directly from wood, the object being to pass into the furnace at a high temperature, a gas containing an excess of hydrogen over oxygen. The mineral contents of the ore in the furnace under these conditions do not become oxidized and remain in a pure condition as small metallic globules throughout the mass. Under ordinary conditions it requires, to complete the entire operation, only from thirty to forty minutes, by which time all of the volatile substances contained in the ore such as zinc, sulfur, arsenic and antimony are eliminated. The heavier metals such as copper, iron, gold, silver and lead remain in the ore in the form of metallic globules.

The furnace is preferably provided with a hopper 3 and a plurality of valves 3 and 4 in the charge pipe whereby the charge may be transmitted to the furnace without the admission of a material amount of atmospheric air. After the ore has been heated and treated as has been stated, the bottom of the furnace is removed and the entire furnace content is discharged into water contained in a cistern or tank such as 6. The shock due to the sudden change of temperature in the material causes the ore to be disintegrated and become exceedingly brittle. This disintegrated mass then passes to a suitable conveyer 7 by means of which it is raised to a suitable height. It then passes through rollers or crushers 8 of any usual or conventional type, although it will be apparent that the material may pass from the water tank 6 by natural gravity to the crusher 8 depending upon the natural conditions and requirements in the erection of the apparatus. After passing through the rollers or crusher 8, the material is discharged by natural gravity into a suitable hopper 9, and thence into a water concentrator 10 in which it comes into contact with an ascending body of fresh water, which enters through a pipe 11 and discharges near the bottom of the concentrator 10. This clean water supplied by the pipe 11 washes out all of the silicious and lighter contents of the material, said silicious and lighter portions being discharged from the water concentrator 10 through a suitable pipe 12. After the silicious and lighter contents have been removed from the mass, the product may be withdrawn into the discharge vat, this product now being an entirely pure metallic product.

It will be apparent to those skilled in this art that by the use of my novel method, the cost of reducing the metallic contents of an ore is reduced to a minimum and that the metallic product obtained will be free from all undesirable and deleterious compounds, and thus be in a very pure condition.

Having thus described my invention, what I claim as new and desire to secure by Letters Patent, is:—

1. The process of reducing the contents of an ore, which consists in first, heating the ore, then treating the ore with a current of heated gas containing hydrogen in excess of oxygen until all volatile and deleterious compounds are removed, and then discharging the heated material into water in order to disintegrate said material, and then discharging said material into contact with a current of ascending water.

2. The process of reducing the contents of an ore, which consists in first heating the ore, then eliminating all volatile and deleterious contents by gases containing hydrogen in excess of oxygen, then disintegrating the heated material by means of water, and then removing the silicious and lighter particles by subjecting the mass to the action of a current of ascending water to remove the silicious particles.

3. The method of reducing the contents of an ore, which consists in heating the ore to an incandescent heat in a furnace, then treating the ore in this condition with a current of gas containing an excess of hydrogen over oxygen until all deleterious compounds have been removed and without oxidizing the mineral contents, then discharging the furnace contents into water, then crushing the material, and then subjecting the product to a current of ascending water until all the silicious and lighter particles are removed.

4. The process of reducing the contents of an ore which consists in first heating the ore, to a low incandescent heat without changing its structural form, then treating the ore with a current of gas produced from wood until the impurities and deleterious compounds are removed, and then discharging the heated material into water.

5. The process of reducing the contents of an ore which consists in heating the ore to a low incandescent heat without changing its structural, form then treating the ore in its heated condition with currents of gas to remove the impurities and deleterious compounds, then discharging the heated mass into water, then crushing the material and then subjecting the products to currents of water to remove the silicious material.

GEORGE F. RENDALL.

Witnesses:
E. HAYWARD FAIRBANKS,
H. S. FAIRBANKS.